United States Patent [19]

Signoret

[11] Patent Number: 4,875,345
[45] Date of Patent: Oct. 24, 1989

[54] HIGH-PERFORMANCE AIR-CONDITIONING INSTALLATION FOR AIRCRAFT

[75] Inventor: Jacques Signoret, Toulouse, France
[73] Assignee: ABG Semca, Toulouse, France
[21] Appl. No.: 144,155
[22] Filed: Jan. 15, 1988

[30] Foreign Application Priority Data

Jan. 16, 1987 [FR] France .................. 87 00453

[51] Int. Cl.[4] .................. F25D 9/00
[52] U.S. Cl. .................. 62/402; 62/86
[58] Field of Search .................. 62/401, 402, 86

[56] References Cited

U.S. PATENT DOCUMENTS

| | | | |
|---|---|---|---|
| 2,777,301 | 1/1957 | Kuhn | 62/136 |
| 2,800,002 | 7/1957 | Seed | 62/402 |
| 3,097,504 | 7/1963 | Quick et al. | 62/402 |
| 3,369,777 | 2/1968 | Furlong | 244/59 |
| 4,015,438 | 4/1977 | Kinsell et al. | 62/402 |
| 4,246,759 | 1/1981 | Signoret | 62/77 |
| 4,265,397 | 5/1981 | Rannenberg | 62/402 |
| 4,295,518 | 10/1981 | Rannenberg | 62/401 |
| 4,334,411 | 6/1982 | Payne | 62/402 |
| 4,374,469 | 2/1983 | Rannenberg | 62/402 |
| 4,419,926 | 12/1983 | Cronin et al. | 98/1.5 |
| 4,546,939 | 10/1985 | Cronin | 244/118.5 |
| 4,665,715 | 5/1987 | Signoret | 62/402 |

FOREIGN PATENT DOCUMENTS 768975 5/1955 United Kingdom .
1583143 5/1976 United Kingdom .

Primary Examiner—Ronald C. Capossela
Attorney, Agent, or Firm—Pollock, VandeSande & Priddy

[57] ABSTRACT

An air-conditioning installation for aircraft, especially for passenger aircraft is disclosed. The energy resulting from the expansion of the air that leaves the cabin is used to actuate at least one element of the installation such as an expansion turbine or a compressor. The temperature of the air leaving the expansion turbine is lower than the temperature of the external air.

11 Claims, 3 Drawing Sheets

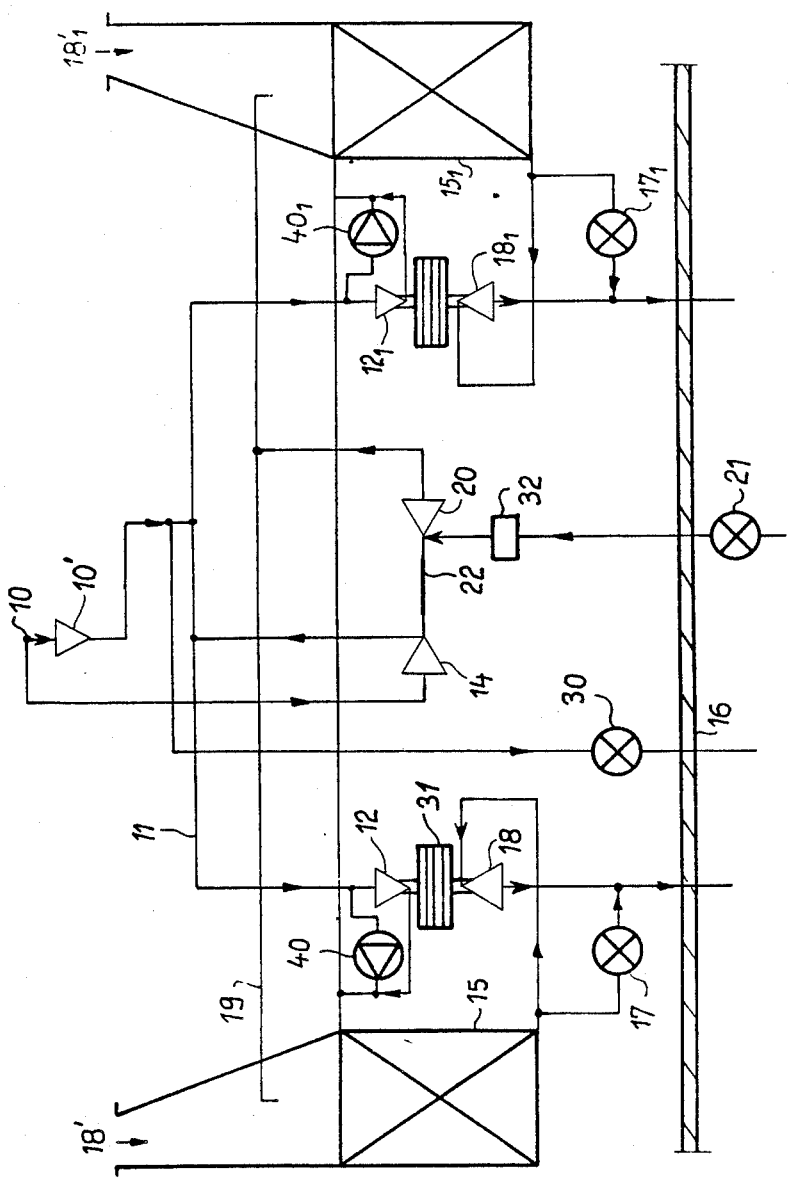

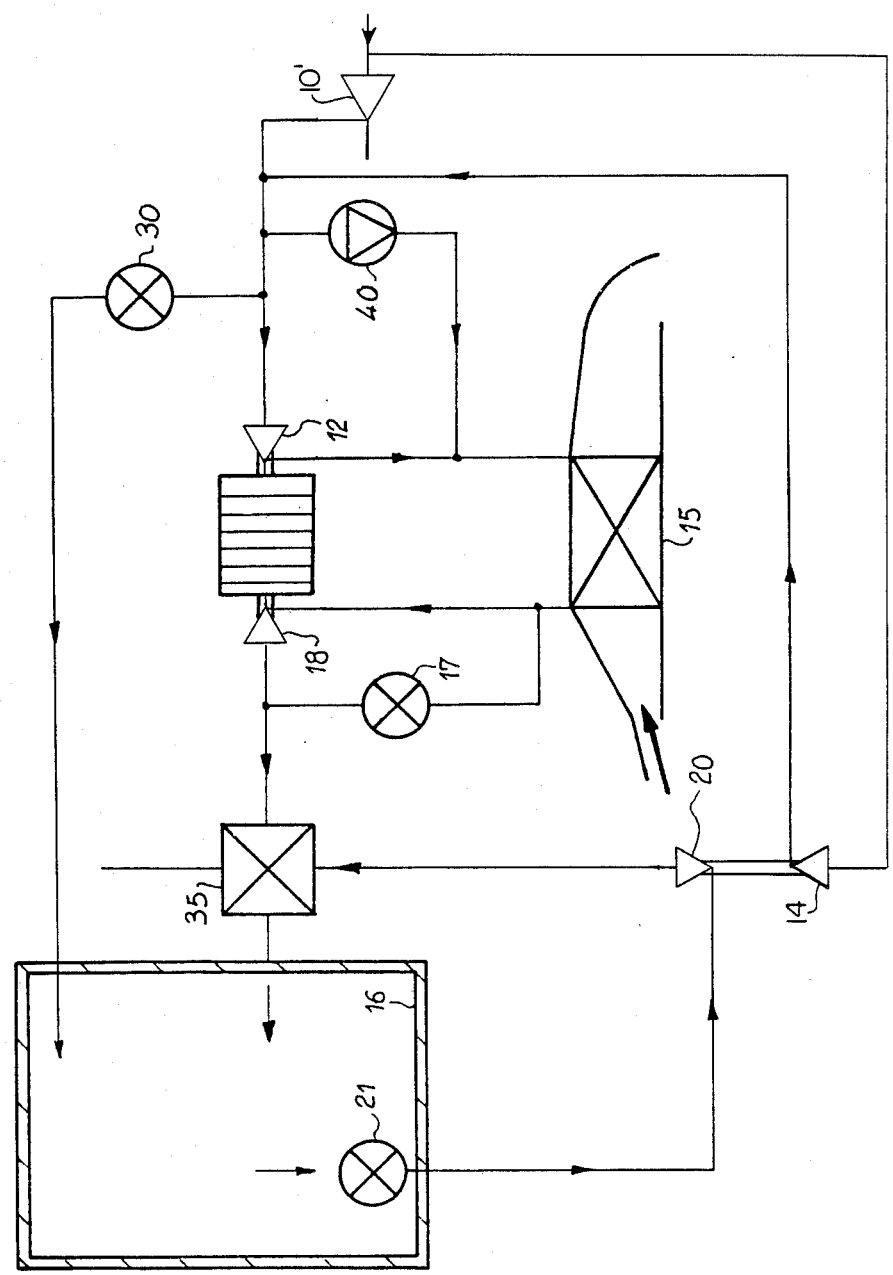

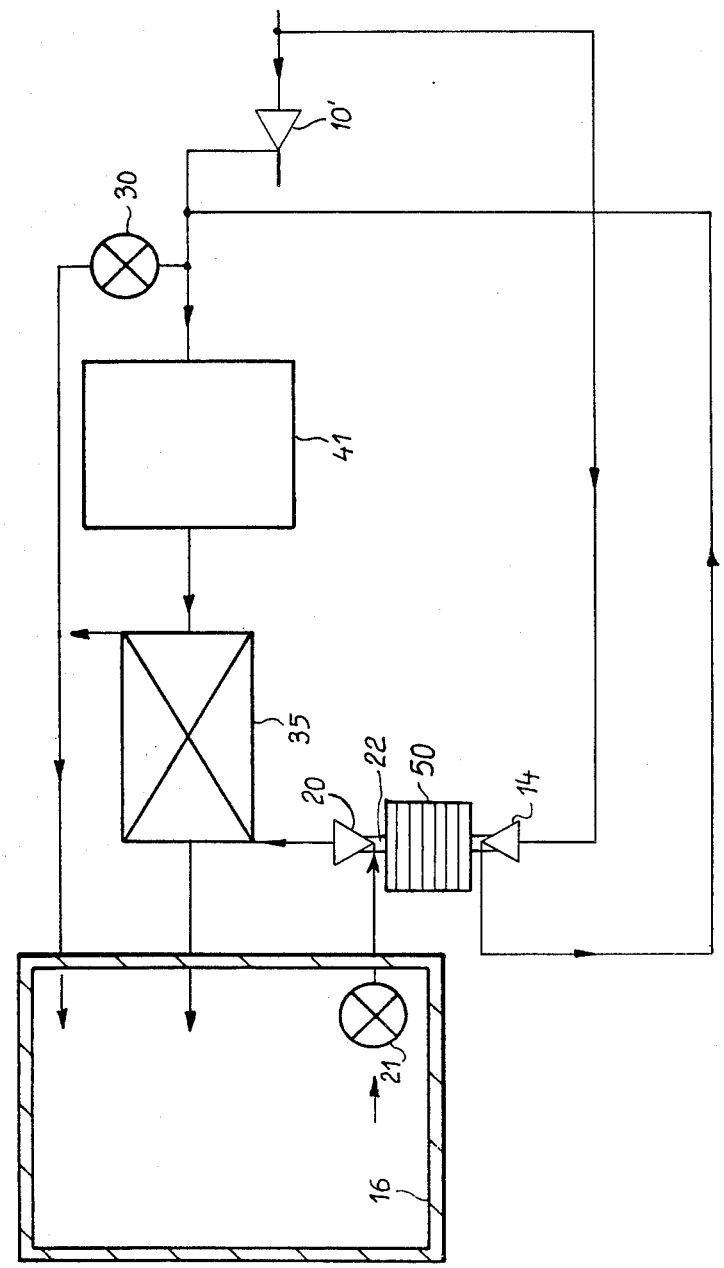
FIG_3

HIGH-PERFORMANCE AIR-CONDITIONING INSTALLATION FOR AIRCRAFT

BACKGROUND OF THE INVENTION

Field of the Invention

The invention pertains to an air-conditioning installation for aircraft, especially passenger aircraft.

The air supply for the passengers of an aircraft flying at high altitude is provided by an air-conditioning installation that uses external air at low pressure, often at about 280 millibars, to deliver air into the cabin at a pressure of about 800 mb and a temperature of about 0° C. (for a cabin generally has to be cooled down because of the heat released by the passengers themselves). For this purpose, the installation has an inlet compressor receiving external air and delivering power-compressed air (hence heated air) either directly into the cabin (if the cabin has to be heated) or into a cooling unit. A cooling unit of this type has a second compressor followed by a heat exchanger subjected to an external air current, for example at a temperature of about 10° C., in order to cool the air. The compressed air that leaves the exchanger is then power-expanded (so that it can be cooled) by means of an expansion turbine mounted on the same shaft as the compressor in order to bring it to the desired pressure and temperature when it leaves the unit.

To adjust the temperature if it is too low, an adjustment is made in the size of the opening of a by-pass valve between the exchanger and the aircraft cabin.

The energy expended to deliver compressed air to the inlet of the cooling unit is significant and desirable to reduce this energy expenditure to a minimum.

The invention can be used to reduce this consumption of energy to the minimum.

For this purpose, the invention is based, firstly, on the fact that the air in the aircraft cabin in flight is at a greater pressure than the ambient pressure and, secondly, on the fact that the efficiency of the air-conditioning installation is all the greater as the coldest point of this installation is at a lower temperature.

According to an embodiment of the invention, the air that leaves the cabin is conveyed to an expansion turbine that gives cold air which is mixed with the cooling air of the exchanger to reduce the temperature at the inlet of the turbine of the cooling unit and limit the lowering of the temperature through the turbine wheel and even eliminate it in certain cases. This makes it possible to reduce the power of the inlet compressor and to do away with the use of an expansion turbine after this inlet compressor.

It is true, that, in the prior art, it has already been proposed to use a turbine for the expansion of the air leaving the cabin in order to produce cold air (for example, in the U.S. Pat. Nos. 4,419,926 and 3,369,777). But the installations proposed up to now are less efficient than the installation of the invention where a turbine is used to produce air at a lower temperature than that of the external air.

According to another embodiment of the invention, which also uses a turbine to expand the air leaving the cabin and which produces air at a temperature lower than that of the external air, the installation comprises an additional heat exchanger placed between the outlet of the exchanger cooled by the external air and the inlet for introducing air into the aircraft cabin, the said additional exchanger being cooled by the air given by the expansion turbine.

The difference between the temperature of the external air and the temperature of the air given by the expansion turbine is, for example, 30° C.

The expansion turbine, actuated by the air that leaves the cabin, preferably drives a compressor receiving outside air, the action of the said compressor being added to that of the inlet compressor. Like this inlet compressor, it gives air at the inlet of the cooling unit. Thus, the power of the inlet compressor is even further reduced.

BRIEF DESCRIPTION OF THE DRAWINGS

Other characteristics and advantages of the invention will emerge from the following description of some of its embodiments, made with reference to FIGS. 1 to 3 which are drawings of air-conditioning installations according to the invention.

DESCRIPTION OF PREFERRED EMBODIMENTS

FIG. 1 shows an air-conditioning installation on board a passenger aircraft which has a first opening 10 to receive external air at a low pressure of about 280 millibars when the aircraft is in flight. This opening is connected, by means of a first compressor 10', to a distribution conduit 11 which is itself connected to the inlet of two identical compressors 12 and $12_1$. The opening 10 is also connected to the input of another compressor 14. A by-pass valve 30 makes it possible, when the cabin 16 (holding the passengers and crew) has to be heated, to bring the air that leaves the compressor 10' directly into the said cabin. When the cabin has to be cooled, the air leaving the compressor 10' is cooled by a cooling unit to which the compressors 12, $12_1$ and 14 belong.

The air leaving the compressor 12 goes through a heat exchanger 15. It leaves this exchanger and is introduced into the cabin 16, passing through an adjustable by-pass valve 17 and an expansion turbine 18 in parallel on the valve 17.

The heat exchanger 15 cools the compressed air leaving the compressor 12. The cooling fluid consists of the external air introduced by a corresponding opening 18'. When the aircraft is in flight, the cooling is supplemented by cold air at a temperature of about −40° C. given by a pipe 19 fed by another expansion turbine 20. According to an important feature of the invention, the said expansion turbine 20 receives the air leaving the valve 21, used to remove air from the cabin 16, and expands it to the external pressure. The turbine 20 is dimensioned in such a way that it produces air at a temperature lower than that of the external air introduced by the opening 18'. In this way, the performance of the air-conditioning installation is greatly raised. In one example, the temperature of the air given by the turbine 20 is lower than the temperature of the external air by about 30° C. According to another major aspect of the invention, the compressor 14 is driven by the shaft 22 of the turbine 20.

In the same way, the compressor $12_1$ is associated with a heat exchanger $15_1$, a by-pass valve $17_1$ and an expansion turbine $18_1$.

The exchanger $15_1$, like the exchanger 15, ensures cooling by the external air through a corresponding opening $18'_1$ and, when the aircraft is in flight, it also provides cooling by the air coming from the turbine 20.

The compressor 14, connected to the opening 10, plays the same role as the compressor 10'. It reduces the power of the said compressor 10' by increasing the flow rate in the conduit 11.

The system works as follows:

In flight, at cruising altitude, the valves 17 and $17_1$ are open and the expansion turbines 18 and $18_1$ are thus not used. The external air, which is compressed by the compressors 10' and 14, flows through the valves 40 and $40_1$ in parallel through the compressors 12 and $12_1$, then in the exchangers 15 and $15_1$ from where it then goes directly into the cabin 16.

Owing to the compression, the air that comes out of these compressors 10' and 14 is at high temperature. The exchangers 15 and $15_1$ ensure cooling so that the air enters the cabin 16 at a temperature of 0° C. In these exchanges, the cooling is obtained firstly, through the external air by the inlets 18' and $18'_1$ and, secondly, through air at approximately −40° C. by means of the turbine 20 which power-expands the air coming from the cabin 16. Furthermore, this expansion enables the compressor 14 to work. In other words, the energy provided by the expansion of the air removed from the aircraft contributes to the compression of the external air and to the cooling of the compressed air.

When the aircraft is on the ground, since the pressure in the cabin 16 is the same as the external pressure it is of course not possible then to use the energy due to expansion when removing the air. This is why the expansion turbines 18 and $18_1$ are used here, the valves 17 and $17_1$ being closed in this case.

However if, during flight, the cooling is not sufficient, the turbines 18 and $18_1$ can be used. In this case, the size of the opening of the valves 17 and $17_1$ constitutes an additional and conventional means for adjusting the temperature in the aircraft cabin 16.

In one alternative (not shown), the shaft 22 of the turbine 20 drives the shaft on which the compressor 12 and the turbine 18 are mounted. In this case, the action of the turbine 20 is added to the action of the motor 31 driving the compressor 12 and the turbine 18 or replaces this motor 31.

In one embodiment, at the inlet of the turbine 20, there is a variable-section injector 32 so that the temperature of the cooling air provided by the pipe 19 can be varied. The cross-section of the injector will be greater and will therefore have the maximum power when the external cooling air is at a relatively high temperature, for example at low altitude. This arrangement can be applied either in the case of the embodiment shown in FIG. 1 or in that of the alternative embodiment described above where the turbine 20 drives the compressor 12.

In the embodiment shown in FIG. 2, the powered expansion produced by the turbine 20 is not used in the exchanger 15 but in an additional exchanger 35 which cools the air leaving the exchanger 15, the valve 17 being completely open.

The advantage of this embodiment as compared with the one described with reference to the FIG. 1 is its greater efficiency, i.e. the fact that less power has to be provided to the air-conditioning installation. However, its cost is higher since an additional exchanger has to be provided.

It is possible to combine both embodiments, for example by having several expansion turbines 20, some of which will be used for the exchanger 15 and others for the exchanger 35.

In the example of FIG. 3, the shaft 22 on which the compressor 14 and the turbine 20 are mounted, is coupled to a motor 50 which is started up when the difference in pressure between the cabin 16 and the exterior is low, i.e. when the aircraft is on the ground or at low altitude. In this case, the cooling unit 41 which comprises the compressor 12 and the turbine 18 can be stopped. The cooling is provided by powered expansion in the turbine 20 which supplies cooling air to the exchanger 35.

What is claimed is:

1. An air conditioning installation for an aircraft including:

expansion turbine means coupled to a passenger cabin exhaust and from said passenger cabin of said aircraft for producing air at a temperature lower than air external to said aircraft, cooling means for cooling air to be introduced into said passenger cabin, said cooling means including a heat exchanger cooled by air external to said aircraft, and means for mixing said air produced by said expansion turbine means with said external air supplied to said heat exchanger.

2. An air conditioning installation as recited in claim 1 further comprising compressor means for compressing air external to said aircraft, means coupling compressed air from said compressor means to said heat exchanger for cooling, said compressor means driven by said expansion turbine means.

3. An air conditioning installation as recited in claim 1 and further comprising:

compressor means for compressing air, turbine means for expanding air from said compressor means to produce air for introduction to said passenger cabin, said turbine means operating when said aircraft is not in flight.

4. An air conditioning installation as receited in claim 3 wherein said cooling means is coupled to said compressor means for cooling air from said compressor means, means coupling air from said cooling means to said turbine means and air from said turbine means to said passenger. cabin, and further comprising an adjustable by pass valve for partially or completely bypassing said turbine means.

5. An air conditioning installation as recited in claim 1 and further comprising a variable section injector coupling air from said passenger cabin to said expansion turbine means.

6. An air conditioning installation as recited in claim 1 wherein a shaft driven by said expansion turbine means has a compressor mounted thereon.

7. An air conditioning installation as recited in claim 1 wherein a shaft driven by said expansion turbine means has a compressor and a motor mounted thereon.

8. An air conditioning installation as recited in claim 1 wherein said expansion turbine means is driven by a motor operative when a pressure difference between said passenger cabin and said external air is below a predetermined threshold.

9. An air conditioning installation as recited in claim 1 wherein said air from said expansion turbine means is cooler than said air external to said aircraft by about 30° C.

10. An air conditioning installation for an aircraft including:

expansion turbine means coupled to a passenger cabin exhaust and driven in flight by exhaust air from said passenger cabin of said aircraft for producing air at a temperature lower than air external to said aircraft.

cooling means for cooling air to be introduced into said passenger cabin, said cooling means including a first heat exchanger cooled by external air, and a second heat exchanger cooled by said air at a temperature lower than air external to said aircraft from said expansion turbine means, said second heat exchanger coupled between an outlet of said first heat exchanger and an inlet to said passenger cabin.

11. An air conditioning installation for an aircraft including:

expansion turbine means coupled to a passenger cabin exhaust and driven in flight by exhaust air from said passenger cabin of said aircraft for producing air at a temperature lower than air external to said aircraft, and cooling means for cooling air to be introduced into said passenger cabin, said cooling means including a heat exchanger cooled by external air and by said air from said expansion turbine means.

* * * * *